Nov. 30, 1965     D. R. HUCKE     3,221,217
ELECTROLYTIC CAPACITOR
Filed April 12, 1962
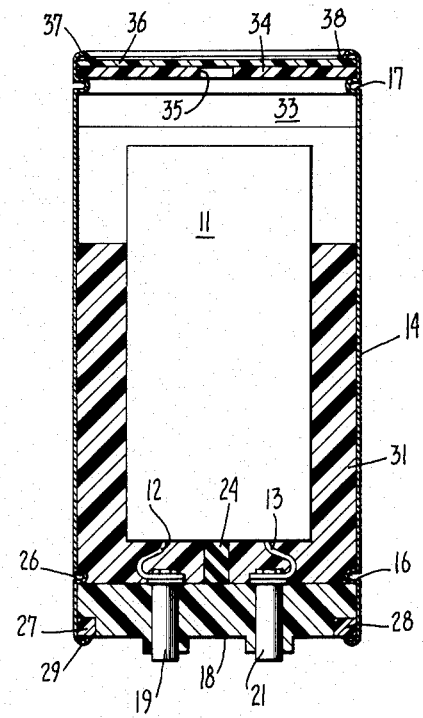
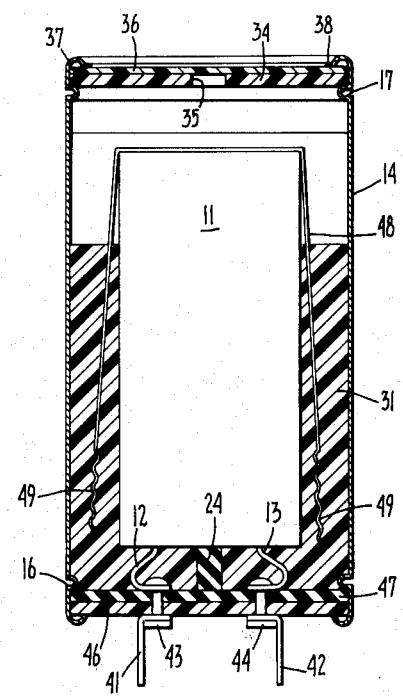
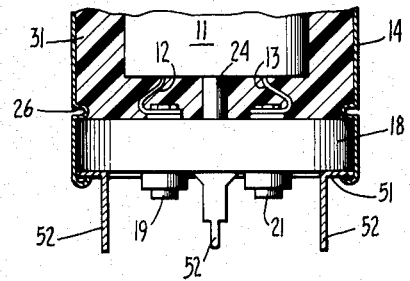
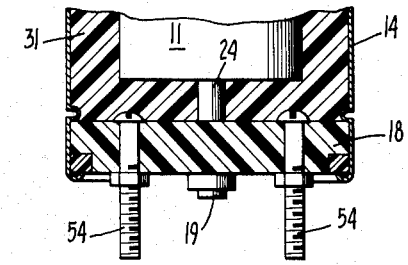
INVENTOR
DON R HUCKE
BY
Gardner & Zimmerman
ATTORNEYS

United States Patent Office 3,221,217
Patented Nov. 30, 1965

3,221,217
ELECTROLYTIC CAPACITOR
Don R. Hucke, 25 Crocker Ave., Piedmont 11, Calif.
Filed Apr. 12, 1962, Ser. No. 187,103
4 Claims. (Cl. 317—230)

The present invention relates, in general, to the construction of electrolytic capacitors and, more particularly to an improved electrolytic capacitor construction providing especial advantages for inverted vertical position operation.

High capacity electrolytic capacitors of the semi-dry or dry types are generally encased within a deep-drawn tubular metal casing having a rigid insulating disk seated into the open end by a rolling operation. Customarily a rubber gasket or some similar expedient means is employed to seal the joint between the metal casing and the disk. Terminals are usually molded or riveted to the disk and an orifice provided with a stopper or similar gas release means is generally provided on said disk. An asphaltic or similar medium low melting point thermoplastic organic material may be employed as a potting agent within the casing to position the capacitor foil assembly. Capacitors constructed in the foregoing manner possess certain disadvantages that may not only materially decrease the life of the capacitor but may also cause damage to other elements positioned adjacent thereto. As an example, if the capacitor is mounted with the terminals projecting downwardly there is always a tendency for electrolyte to leak from the vent hole or from poorly sealed joint areas. The problem is aggravated when elevated gas pressure is produced as in prolonged service and especially in the event of a malfunction such as an electrical overload, which may cause forcible ejection of electrolyte and/or molten potting compound if overheating occurs. Moreover, usual potting compounds may soften if excessive temperatures occur for other reasons, wherefore the capacitor plate assembly may short circuit to the casing, terminals may be sheared off and other serious consequences may result. Another disadvantage is due to the manner in which the insulating terminal disk is secured in the metal casing. More particularly, the rolled edge of the open end of the casing is relied upon as the sole means by which the disk is retained in place. As a result unavoidable vibrations to which capacitors may be exposed, often causes breaking of terminal connections within the capacitor and weakening of the seal at the rolled edge. The disastrous damage which can be produced beneath a circuit panel or to the operation of an electrical circuit under the foregoing circumstances has long been known in the electrical arts.

I have conceived of a materially different structural arrangement and construction of the indicated type of electrolytic capacitor which overcomes the aforementioned difficulties and particularly those noted when the capacitor is to be mounted vertically with the terminals projecting downwardly. In this construction I employ a cylindrical casing in which a terminal closure is disposed at the lower end thereof and securely retained in position by means of the potting compound. The upper end may also be provided with an effective gas diffusing closure providing an emergency excess pressure release and other advantageous structural features may also be provided.

Accordingly it is an object of my invention to provide an improved electrolytic capacitor.

Another object of my invention is to provide an electrolytic capacitor which is especially suited for operation with the terminals in a downwardly projecting orientation.

Still another object of my invention is to provide an electrolytic capacitor construction in which the terminals are disposed in hermetically sealed relation in the lower end of the cylindrical casing and gas pressure release means is provided in the upper end so as to minimize leakage of the electrolyte therefrom.

A further object of my invention is to provide an electrolytic capacitor construction wherein a cylindrical casing to enclose the foil assembly and the closure upon which the terminals are disposed are preferably sealed in place by means of certain thermosetting potting materials being introduced into the open end of the casing in a liquid or semiliquid form following the proper positioning of the foil assembly and terminal closure member.

A still further object of the present invention is to provide an electrolytic capacitor construction in which the terminal closure member, foil assembly, terminals and electrical connections between the terminals and foil assembly are rigidly positioned relative to one another by means of the potting material.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing may be adapted within the scope of the invention as set forth in the claims.

With reference to said drawing:

FIGURE 1 is a vertical cross-sectional view of a first embodiment of an electrolytic capacitor constructed in accordance with the invention.

FIGURE 2 is a vertical cross-sectional view of a second embodiment of an electrolytic capacitor constructed in accordance with the invention.

FIGURE 3 is a portional vertical cross-sectional view of the first embodiment of an electrolytic capacitor illustrating a preferred mounting means therefor.

FIGURE 4 is a portional view similar to FIGURE 3 and illustrating a modified form of mounting means.

In brief, the electrolytic capacitor of the invention utilizes an electrolytic capacitor foil assembly of a conventional character. Such assembly is disposed in a cylindrical sleeve case provided at one end with terminal mounting strip means which assembly is positioned and said mounting strip means is sealed by means of preferably a thermosetting potting compound. The other end of said case, which is generally disposed uppermost is open during assembly to permit introduction of the potting compound into the casing. The opening is subsequently sealed in a manner affording release of internal gas pressure.

More particularly, in the first embodiment of the invention as illustrated in FIGURE 1 of the drawing there is utilized a capacitor foil assembly 11 constructed in a conventional manner and generally including a pair of coiled aluminum foil capacitor plates separated by a cellulose material saturated with fluid or semifluid electrolyte. In high capacity types of capacitors it will be understood that the foil is usually etched and otherwise treated. Ordinarily, the material aforesaid is extended to cover all exposed portions of the coiled plates, aluminum strap or wire conductors 12 and 13 lead exteriorally of the coil assembly 11 to provide electrical connections thereto as disclosed more fully hereinafter.

The foil assembly 11 is disposed within a cylindrical sleeve casing 14 usually formed of thin aluminum circumferentially constricted inwardly of either end to provide lower and upper shoulders 16 and 17, respectively, therein. The lower end of said casing is provided with a closure disk 18 which is transpierced by a pair of internally threaded terminal members 19 and 21 formed of a conductive material to provide terminals for connecting the capacitor into an electrical circuit. The disk 18 may be molded from phenolaldehyde resin composition or equivalent material with the terminal members pins 19 and 21 in place. To facilitate fabrication the projecting ends of conductors 12 and 13 may be connected to the upper ends of member pins 19 and 21, respectively, and retained in place as by riveting in the conventional manner. A block 24 of insulating material is utilized in spaced relation with respect to the upper surface of disk 18. The unitary assembly provided thereby may then be slid into the casing 14 until the peripheral edge 26 of the disk 18 bears against shoulder 16 and the foil assembly is positioned concentrically therein. Lower peripheral portions 27 of the disk 18 may be reduced to accommodate a resilient gasket 28. The disk 18 may be sealed firmly in place by crimping or rolling the lower edge of casing 14 to provide a lip 29 bearing on the lower surface of gasket 28.

As a prime feature of the invention a potting compound 31 preferably of a thermosetting nature is introduced in the upper end of casing 14 to fill all of the open spaces in the lower portion thereof and extending upwardly between foil assembly 11 and casing 14 for at least one-fourth the length of said assembly and not exceeding the length thereof leaving a space 33 in the upper portion of the casing for gas expansion. Thenceforth the potting compound is cured, in situ, with the application of heat if necessary wherefore the disk 18 is tightly sealed, the foil assembly 11 is firmly anchored in place, the casing is reinforced and the conductors are anchored, supported and insulated. The upper end of the casing is then closed to provide the completed capacitor. Preferably, the upper end is sealed by means of a molded plastic disk 34, e.g., Bakelite $\frac{1}{16}$" in thickness provided with a perforation 35 of $\frac{1}{4}$" to $\frac{3}{8}$" or more diameter and with a superposed diaphragm 36 of flexible gas permeable material held in place as by means of a rolled lip 37. Supplementary sealing, if required, may be provided by disposing cement 38 to cover the joint between lip 37 and diaphragm 36. A suitable material for said diaphragm 36 are rubber such as Buna S, natural rubber, etc., of about $\frac{1}{32}$" in thickness which is relatively permeable to gases so that gas normally produced very slowly by the capacitor in operation may escape through perforation 35 and diffuse through the diaphragm. However, a safety feature is provided by the described sealing means in that if a rapid evolution of gas, etc., is caused by overload, overheating or failure of the capacitor, the diaphragm 36 and disk 34 may serve as a rupturable pressure relief means and allow the capacitor contents to selectively discharge upon upper portions of a chassis mount instead of below as in present circumstances. The discharged material therefore is likely to cause little or no damage to other operating components of the circuit and can be much more easily removed due to the character of upper chassis surfaces.

The aforesaid potting compound is preferably an epoxy type formulation since such a material generally provides superior adhesion, rigidity, sealing and undergoes less dimensional change during curing. However, other suitable materials may be found among the phenol-aldehyde, polyurethane, silicone and similar materials which have been employed as potting compounds provided chemical inertness, electrical resistivity and the like are satisfactory. Generally speaking potting compounds of the character contemplated herein are preferably formulated of fluid or semi-fluid thermosetting resins, curing agents and/or catalysts and inert fillers as well as other materials such as plasticizers. It should be understood that waxes or other suitable materials may be used as potting compounds. The preferred epoxy type materials have been described extensively in the literature, e.g. in the Plastics Engineering Handbook, chapter 15, third edition and also in the first supplement to the "Encyclopedia of Engineering Chemistry and Technology" published by the Interscience Publishing Co. The epoxy resins are obtained by reacting epichlorohydrin and bisphenol A in the presence of other polyhydric materials in the presence of NaOH. Phenolic resins and aliphatic polyols may be present. Catalytic polymerization or coupling and esterification reactions may be used for curing. Usually adiamine coupler is used for curing but polysulfides, anhydrides and correacting resins can be used. Silica powder is a suitable filler but pulverized phenol-aldehyde resin or other good heat conducting materials can also be used. A thiaplast such as fluid polysulfide (thiokol) rubber can be used as a plasticizer. The compounded formulation usually cure in a few hours time at room temperature but only a few minutes are required with heating to 120–200° F. A more satisfactory cure is obtained at the higher temperature.

A second embodiment of the capacitor of the invention is illustrated in FIGURE 2 of the drawing wherein similar components are indicated by reference characters similar to those in FIGURE 1. The foil assembly 11 in this case may be connected to tab terminals 41 and 42 which may be made of aluminum or of a solderable material such as copper, brass, steel, etc., as by means of rivets 43 and 44, respectively, which transpierce the end closure. The rivets likewise may be of any desired metal since the potting compound 31 does not permit the electrolyte of the foil assembly to contact and react with the rivet or embedded conductors. A modified terminal strip closure is provided comprising a laminated Bakelite disk 46 and a rubber disk 47 the latter of which may be disposed to either side of the plastic disk. A strap 48 is folded over the upper end of assembly 11 with the downwardly dispensing ends 49 being deformed as by crimping, perforating knurling or the like so as to become solidly anchored in the potting material 31. This arrangement provides a very firm anchorage for the foil assembly 11 and is suitable for use even where severe vibration and shock loading is incurred. The portion of the strap 48 which covers the upper end of assembly 11 should be perforated to allow escape of gases formed during operation and to allow free access of the electrolyte, if fluid, to the upper portion thereof. Preferably moderate pressure is applied to said upper portion of the strap and end of assembly 11 to preload the structure to provide the most rigid positioning.

Since the potting material greatly reinforces the lower portion of the sleeve 14 and also the terminal strip of the capacitor a great deal of latitude is permitted in the choice of mounting which may be utilized. Several types of mountings which cannot be used with the conventional fragile capacitor may even be used. For example, a twist prong type of mounting means can be provided as illustrated in FIGURE 3 of the drawing. A flat ring 51 having downwardly projecting prongs 52 may be affixed to the lower end of casing 14 as by spinning or rolling. Such a mounting is inserted into a punched metal or Bakelite chassis washer or socket (not shown).

A second mounting means may be provided as shown in FIGURE 4 of the drawing wherein threaded studs 54 are provided in disk 18 of the first embodiment of the invention described above. More particularly such studs may be attached to disk 18 during the molding operation by molding them into the disk with the heads 56 exposed or not as desired. Alternatively the studs 54 could be inserted in holes provided in disk 18 with the heads 56 projecting upwardly so that the potting materials would firmly seat such studs. Of course, means may also be employed which involves clamping about the potted section or other similar means may be employed. It will be appreciated that the potting material minimizes or eliminates the effects of deforming pressures or fracture of the disk in the event that excessive strain or vibration is applied to the mounting in use or otherwise.

What is claimed is:
1. In an electrolytic capacitor of the dry or semidry type including a foil assembly provided with connecting conductors, the combination of a tubular metal casing in which said foil assembly is disposed, an insulated terminal strip disk being secured rigidly in one end of said casing, a rigid insulating spacer member interposed between said disk and said assembly, a pair of terminal members transpiercing said disk and secured rigidly thereto and being electrically connected to said conductors, a potting material disposed in said one end of the casing sealing and attaching said disk to said casing and enclosing said conductors and the lower end of said foil assembly, and sealing means closing the second end of said casing.

2. In an electrolytic capacitor of the dry or semidry type including a foil assembly provided with connecting conductors, the combination of a tubular aluminum casing provided in each end region with circumferential constrictions, in which said foil assembly is disposed, an insulated terminal strip disk disposed in one end of said casing and bearing against said constriction, a pair of terminal members transpiercing said strip and rigidly secured thereto, said terminal members being electrically connected to said conductors, a thermoset potting material disposed in said one end of the casing sealing said disk to said casing and enclosing the lower end of said foil assembly and conductors, and sealing means including a perforated disk and a gas permeable pressure rupturable diaphragm disposed within the second end of said casing.

3. The capacitor as defined in claim 2 wherein there is included a strap member passing over the upper end of said foil assembly and having downwardly projecting ends anchored in said potting material.

4. The capacitor as defined in claim 2 wherein external mounting means associated with said one end of said casing is secured in rigid relation with said terminal strip.

References Cited by the Examiner
UNITED STATES PATENTS

| | | | |
|---|---|---|---|
| 2,129,089 | 9/1938 | Hood | 317—230 |
| 2,234,042 | 3/1941 | Deeley | 317—230 |
| 2,274,327 | 2/1942 | Georgiev et al. | 317—230 |
| 2,623,101 | 12/1952 | Kurland et al. | 317—230 |
| 2,758,149 | 8/1956 | Brennan | 317—230 X |

DAVID J. GALVIN, *Primary Examiner.*